March 24, 1970     B. E. KURTZ ET AL     3,502,733

PRODUCTION OF CHLOROMETHANES

Filed Nov. 8, 1967

INVENTORS:
BRUCE E. KURTZ
WALTER E. SOMMERMAN
BY

*Clement Weiser*

ATTORNEY

United States Patent Office 3,502,733
Patented Mar. 24, 1970

3,502,733
PRODUCTION OF CHLOROMETHANES
Bruce E. Kurtz, Syracuse, N.Y., and Walter E. Sommerman, Mountain Lakes, N.J., assignors to Allied Chemical Corporation, New York, N.Y., a corporation of New York
Continuation-in-part of application Ser. No. 442,025, Mar. 23, 1965. This application Nov. 8, 1967, Ser. No. 685,234
Int. Cl. C07c 17/16
U.S. Cl. 260—657                                7 Claims

ABSTRACT OF THE DISCLOSURE

This application is directed to a process for preparing the chlorides of methane containing less than 500 parts per million dimethyl ether by reacting hydrogen chloride and methanol in the presence of an aqueous zinc chloride catalyst solution containing 52 to 80 weight percent zinc chloride, said catalyst dispersed in said hydrogen chloride and methanol and said reaction being conducted at a temperature from 60° to 135° C.

---

This application is a continuation-in-part of application Ser. No. 442,025, filed Mar. 23, 1965, now abandoned.

It is well known to produce the higher chlorides of methane such as methylene chloride, $CH_2Cl_2$; chloroform, $CHCl_3$; and carbon tetrachloride, $CCl_4$, by chlorinating methane or methyl chloride or mixtures of these compounds. Generally, the reaction involves a substitution of chlorine for hydrogen atoms in methane or methyl chloride with the formation of the higher chlorides of methane and the simultaneous production of hydrogen chloride in an amount equivalent to about half the chlorine supplied to the process. It will be evident that an undesirable feature of the known processes is the simultaneous production of the relatively worthless compound HCl because of the elaborate equipment required in the hydrogen chloride recovery system which adds considerably to the cost of production.

It is also well known in the art to produce methyl chloride, one of the reactants in the prior art processes for the production of chloromethanes, by reacting methanol and hydrogen chloride. It has been attempted to utilize this well-known reaction in the production of chloromethanes utilizing the hydrogen chloride produced in the chlorination process.

Although a straightforward combination of existing technology on production of methyl chloride from hydrogen chloride and methanol, and chlorination of methyl chloride to chloromethanes is advantageous in that the hydrogen chloride produced from the chlorination reaction is converted to methyl chloride; nevertheless, from a commercial standpoint this straightforward combination of techniques is not satisfactory because of the large number of processing steps and elaborate equipment required. In an effort to simplify the process, it has been attempted to carry out the methanol-hydrogen chloride reaction in conjunction with the chlorination reaction by using a solid catalyst downstream of the chlorination reactor, with methanol being introduced at this point. This attempt at combining the chlorination reaction with the methanol reaction has not been entirely successful because chloroform and carbon tetrachloride which are also produced in the reaction appear in the chlorinator effluent, and these compounds decompose on the surface of the solid catalyst causing carbonization at the surface and loss of activity. One method proposed (U.S. Patent No. 2,406,196—1946) to alleviate this problem suggests a partial condensation of the effluent from the chlorination reactor to remove the greater portion of the chloroform and carbon tetrachloride prior to reaction with methanol in the presence of the solid catalyst. This procedure, however, requires additional processing steps and the added equipment necessary adds to the cost of the process.

In order to avoid carbonization of the solid catalyst, the art tried a liquid catalyst and attempted to conduct the reaction of hydrogen chloride and methanol by introducing the hydrogen chloride and methanol into a static body of liquid catalyst (British Patent No. 708,194). This procedure, however, is also not satisfactory because the effluent from the chlorination stage was relatively dilute with respect to hydrogen chloride and the large volumes of gas to be handled could not be effectively dispersed in the liquid catalyst without necessitating a reactor of abnormally excessive cross-sectional area. The hydrogen chloride and methanol reactants in this type of reaction are dispersed in the catalyst solution which is in the form of a static bed. Furthermore, dimethyl ether is produced as a by-product to an extent varying from several hundred parts per million to several percent. This caused problems in the purity of the final product, as well as reducing the conversion of the methanol.

It has now been found that the advantages incident to the utilization of by-product hydrogen chloride wherein it is reacted with methanol to form further amounts of chlorinated methane products may be retained, at the same time avoiding the disadvantages inherent in previously available procedures. This is accomplished by a new and improved process for handling the reaction products of the chlorination system and for converting the by-product hydrogen chloride by reaction with methanol to methyl chloride.

It is an object of our invention to provide an improved process for the preparation of chloromethanes from hydrogen chloride and methanol.

Another object is to utilize by-product hydrogen chloride produced in the conventional chlorination procedures, in the formation of further amounts of chloromethanes without the disadvantages incident to previous attempts to utilize the by-product hydrogen chloride.

These and other objects of our process will be apparent from the following detailed description of the invention.

The present process is directed to a commercially feasible method for preparing chloromethanes by reacting hydrogen chloride with methanol and a liquid zinc chloride catalyst solution in a manner such that the liquid catalyst is dispersed in the reacting gases to effect almost quantitative reaction of the hydrogen chloride and methanol with little, if any, formation of by-product dimethyl ether. The process has been found to be particularly effective when the feed material consists of the gaseous chlorinated products from the reaction of chlorine and methane, methyl chloride, methylene chloride, chloroform and mixtures of these compounds in various proportions in any of the manners known in the art for conducting said reaction for the production of chloromethanes and concomitant production of substantial amounts of by-product hydrogen chloride. It is the economical and feasible utilization of this by-product HCl to which the present invention has particular application, particularly since the HCl is in relatively dilute form. The catalyst solution may flow in contact with the reacting gases either in a countercurrent or co-current fashion to the reacting gases. This concept of reacting the methanol and hydrogen chloride in the presence of a liquid catalyst stream dispersed in the reacting gas stream results in almost complete conversion of the hydrogen chloride to methyl chloride without any of the disadvantages of the prior art i.e., little or no dimethyl ether production with substantially less processing equipment than was previously required.

The process is conducted at elevated temperatures which are maintained within the range of 60° to 135° C., preferably 100° to 130° C. Temperatures above 135° C. should be avoided because at the higher temperatures the catalyst becomes so concentrated, above about 80% by weight zinc chloride as to become excessively viscous and difficult to disperse in the reacting gases.

The concentration of the aqueous zinc chloride catalyst solution should be maintained within the range of 52 to 80 weight percent, preferably 55 to 80 weight percent, zinc chloride with better performance being obtained at the higher zinc chloride concentrations. At catalyst concentrations below about 52 weight percent zinc chloride the efficiency of the reaction is reduced.

As mentioned above, there is little, if any, dimethyl ether produced in the reaction of the present invention. It has been found that with methanol conversions in excess of 90% there are obtained less than about 500 parts per million, preferably less than 200 parts per million, with an especially preferred result of less than 100 parts per million of dimethyl ether formed during the reaction. These results are not obtained in the prior art process employing a static bed of catalyst solution. The disadvantages of the presence of dimethyl ether by-product are well known to those skilled in the art. Dimethyl ether is very difficult to separate from methyl chloride by distillation. Its presence in methyl chloride cannot be tolerated and is an undesirable contaminant. Removal is generally accomplished by chemical treatment involving additional processing.

The recovery and separation of the reaction products from the gaseous composition produced in the methanol reactor generally involves selective condensation of the organic substituents of the gaseous composition which results in partial condensation of the gases to form water and organic phase. These separate layers are then separated in a conventional manner and the resulting liquid mixture of the chlorinated products may be rectified by recourse to appropriate distillation techniques. It may further be advisable to treat the chlorinated methanes with small amounts of alkali such as sodium carbonate, sodium hydroxide or the like to neutralize small quantities of acid, notably hydrochloric acid which may remain unreacted. The chlorinated methanes are capable of dissolving very small, but nevertheless finite amounts of water. If removal of all or a significant portion of this water is advisable, it may be accomplished by drying the chlorinated organics by use of drying agents such as calcium chloride. The uncondensed gases are thereafter recycled to the chlorination zone for further contact with chlorine gas.

The process may be better understood from the following description of the drawing representing a flow diagram illustrative of a preferred arrangement of apparatus for carrying out the process.

Numeral 10 designates a conventional chlorination reactor equipped with provision for the introduction of the reactants, chlorine gas and organic materials. The reactor may consist of either a single or a multi-stage chlorination system either adiabatic, diabatic or isothermal in nature. The chlorine gas is introduced into the reactor through line 11 where it is contacted with recycled gas from the process comprising predominantly methyl chloride, together with lesser amounts of methylene chloride, chloroform and carbon tetrachloride which enters reactor 10 through line 12. Provision is also made for the introduction of make-up organic material such as methane, methyl chloride, or the higher chlorides of methane, that is, methylene chloride, chloroform, and carbon tetrachloride through line 13. This may be the recycle stream from the distillation tower, not shown. The feed ratio of chlorine gas to organic material fed into the reactor is dependent upon the temperatures employed and is controlled so as to restrict the amount of carbon and hydrogen chloride which form in the reaction. For effective results, the temperature in reactor 10 should desirably be within the range of about 350° C. to 500° C. and preferably, within the range of about 400 to 450° C. The reaction temperatures may be maintained within these ranges by conventional procedures well known in the art. Normally, at temperatures of 350 to 500° C., the ratio of chlorine gas to organic material may vary from about 0.15 to 4.0 moles of chlorine per mole of organic material. When the higher ratios are employed, it is usual to introduce the chlorine stagewise, so as to prevent formation of excessive amounts of carbon. The reaction may be conducted at substantially atmospheric pressure although sub-atmospheric or super-atmospheric pressures may be employed if desired.

There is produced in reactor 10 the higher chlorides of methane together with by-product hydrogen chloride, the latter being produced in an amount equivalent to about half the chlorine supplied to the process. These products which, under the reaction conditions, are produced in gaseous form are passed from reactor 10 through line 14 and directed to the upper portion of methanol reactor 15.

The design of the methanol reactor is such that the effluent from the chlorination reactor containing the gaseous higher chlorides of methane as well as the hydrogen chloride by-product, is contacted with the aqueous zinc chloride catalyst solution in a manner such that the catalyst solution is dispersed in the chlorination effluent gases. For this purpose, the methanol reactor which may be employed in the process of the present invention and illustrated in the drawing is a packed tower containing packing or other similar material equipped with provision for the introduction of the reactants. The tower, however, need not necessarily contain a packing material in which case the catalyst solution is dispersed in the reactants, such as by passing the catalyst solution in countercurrent contact with the reactants in a manner to effect dispersion of the catalyst solution in the reactants.

In the attached drawing the liquid catalyst solution is introduced into the methanol reactor 15 at the upper portion thereof. The methanol required for the reaction may be introduced to reactor 15 as a vapor together with the hydrogen chloride gas effluent or as a liquid mixed with the circulating catalyst stream. The catalyst solution should, however, be dispersed in the reactants. For purposes of illustration, the methanol in the form of a liquid in line 16 is admixed with the zinc chloride solution from line 17 and both streams are thereafter introduced into the top of methanol reactor 15 through line 18. Into the upper portion of the reactor is also introduced the effluent gas stream through line 14. The gas stream, zinc chloride solution, and methanol are thereafter contacted co-currently in reactor 15 and passed downwardly through the reaction column. If a packed column is employed the packing material serves to disperse the aqueous zinc chloride solution in the effluent gases. The temperatures employed in methanol reactor 15 are substantially less than those employed in the chlorination reactor and should not exceed about 135° C. In the methanol reactor, the reaction may be performed at substantially atmospheric pressure although sub-atmospheric or super-atmospheric pressures may be employed if desired. Preferably atmospheric, or pressures slightly in excess of atmospheric pressures are employed to avoid the necessity of any high pressure equipment, thus increasing capital investment. Under these conditions, i.e., dispersing the aqueous zinc chloride catalyst solution containing 52 to 80 weight percent zinc chloride in the reactants and conducting the reaction at the aforementioned temperatures, the reaction between methanol and the hydrogen chloride is effected with almost complete utilization of the hydrogen chloride, with less than about 500 parts per million (0.05 weight percent) dimethyl ether being formed.

The catalyst solution is collected at the base of the methanol reactor 15 and is withdrawn through line 19 by means of pump 21 and thereafter enters a heat exchanger 23 through line 22. In the heat exchanger, the zinc chloride solution is cooled by indirect heat exchange and thereafter recycled through lines 17 and 18 into the top of reactor 15 for further contact with the effluent gases from chlorination reactor 10. The gases produced in the reactors comprising principally methyl chloride, methylene chloride, chloroform, and carbon tetrachloride are separated from the liquid at the bottom of the reactor 15 and directed through line 24 into a conventional condenser-decanter 25 in which the gases are partially condensed and organic and aqueous phases are formed and separated. Prior to this treatment, however, it may be desired to treat the chlorinated methanes with small amounts of alkali to neutralize small quantities of acid which remain. This neutralization procedure may be performed by any of the methods known in the art.

Organic and aqueous layers are formed which are collected and continuously separated in the decanter section of the conventional condenser-decanter 25. The aqueous layer is discharged through line 20 and the organic liquid comprising principally methylene chloride, chloroform, and carbon tetrachloride is discharged through line 26 from the condenser-decanter where it is subjected to a drying operation in dryer 27. For this purpose, the liquid may be contacted with a drying agent such as $K_2CO_3$ to remove any water remaining in the organic liquid. After the drying operation, the organic liquids are thereafter directed to a distillation procedure through line 28 for separation and recovery of the various chlorides of methane produced. The uncondensed chloromethanes are directed to a gas dryer 30 through line 32 to remove any water remaining in the gases. From the gas dryer 30, the chloromethane gases are further condensed in condenser 33 entering through line 31 where further condensation of the gases into organic liquids takes place. For this purpose, the condenser 33 is operated at a temperature lower than that in the condenser-decanter. Uncondensed gases containing largely methyl chloride are recycled through line 12 back to the chlorination reactor for further reaction with incoming chlorine gas while the organic liquid which is condensed in condenser 33 is directed through line 34 where the organic liquid is merged with the stream exiting from organic liquid dryer 27. Incompletely chlorinated products separated in the disillation may also be recycled.

The following examples will illustrate the invention.

EXAMPLE 1

Chlorine gas was introduced into a conventional chlorination reactor containing ten reaction stages. The chlorine feed rate was 576 grams/hour divided among the ten stages. Methyl chloride was introduced into the reactor at a rate of 456 grams/hour. The temperature was maintained at 460° C.

The effluent from this reactor, comprising chloromethanes plus hydrogen chloride was fed to a methanol reactor which comprises a two-inch diameter column approximately four feet high and packed with ¼″ saddles. Through the reactor was circulated co-current with the reactant gases a 75 wt. percent solution of zinc chloride and water. Methanol was introduced to the top of this reactor at a rate of 300 cc./hr. of liquid and was vaporized before being mixed with the reactant gases at the top of the reactor, the reactant gases flowing downward co-current with the liquid catalyst. The liquid catalyst was collected at the bottom of the reactor and was recirculated to a heat exchanger and thence to the top of the methanol reactor. The reactor temperature was maintained at about 116° C. and was maintained by the heat exchanger acting on the recirculating liquid catalyst stream. The molar ratio of methanol to hydrogen chloride was 0.97 to 1.

The effluent gas from the methanol reactor was of the following composition, expressed in terms of wt. percent basis 100% chloromethanes; 57% methyl chloride, 25% methylene chloride, 16% chloroform and 2% carbon tetrachloride. The conversion of the methanol introduced to the methanol reactor was found to be 92%. The effluent gases from the second reactor were partially condensed and the organic and water phases separated by decantation. The dimethyl ether content of the effluent gas was less than 100 parts per million.

EXAMPLE 2

Chlorine gas was introduced at the rate of 516 grams/hour divided among nine stages of a chlorination reactor similar to the reactor of Example 1. The methyl chloride feed rate was 456 grams/hour and the temperatre within the reactor was maintained at about 460° C. The effluent from the reactor was introduced to a second reactor consisting of a vertical column with a reaction zone approximately four feet high and two inches in diameter, containing no packing, but with a catalyst solution dispersed in such a way as to wet the walls of the reaction zone. The reactor temperature was maintained at approximately 115° C.

Methanol was introduced in the same manner as described in Example 1 at a rate of 300 cc./hr. of liquid. The molar methanol/hydrogen chloride ratio was 1.07 to 1.

The effluent gas from the second reactor was of the following composition, expressed in terms of wt. percent basis 100% chloromethanes; 57% methyl chloride, 29% methylene chloride, 14% chloroform, .4% carbon tetrachloride. The methanol conversion was found to be 92%.

EXAMPLE 3

This example utilized the equipment described in Example 1. The chlorine feed rate to the chlorination reactor was 180 grams/hour. The organic feed rate to the chlorination reactor was 1370 grams/hour of methyl chloride, 1500 grams/hour of methylene chloride, 600 grams/hour of chloroform, 96 grams/hour of carbon tetrachloride, and 366 grams/hour of hydrogen chloride. The effluent from this reactor was introduced to the methanol reactor and the temperature was maintained at approximately 100° C. Methanol was introduced to the reactor at a rate of 300 cc./hour of liquid. The molar ratio of methanol to hydrogen chloride was 0.61 to 1. The methanol conversion was found to be approximately 100%.

EXAMPLE 4

This example illustrates the reaction of methanol and hydrogen chloride with substantially little dimethyl ether being produced. The methanol reactor was as described in Example 1, with the temperature being controlled at about 113° C. Hydrogen chloride was introduced into the reactor at a rate of 820 grams/hour and methanol at a rate of 560 cc./hour of liquid. The molar ratio of methanol/hydrogen chloride was 0.64 to 1.

The methanol conversion was found to be 94%. The dimethyl ether content of the effluent gases was less than about 100 parts per million.

EXAMPLE 5

A run similar to the run conducted in Example 1 was conducted except that a reactor consisting of a 2-liter agitated, glass vessel was employed. The vessel contained in the form of a static bath, about 1 liter of an aqueous zinc chloride catalyst solution containing 75% zinc chloride. Hydrogen chloride gas was fed through a sparger with a liquid methanol into the catalyst bath. The feed rates were approximately 350 grams per hour HCl and 350 cc. per hour of methanol. The molar ratio of methanol to HCl was 0.90 to 1. The reactor temperature was maintained at approximately 130° C. The effluent gases were analyzed and the conversion of methanol was found to be 90%. Dimethyl ether content was found to be 2.3% (23,000 parts per million).

In comparison, the results obtained demonstrate that by dispersing the liquid catalyst in the reacting gases the effluent gas contained less than one hundred parts per million dimethyl ether.

EXAMPLE 6

A run similar to the run conducted in Example 1 was conducted except that the catalyst strength was maintained between 45 and 50 weight percent zinc chloride. The reactor temperature was maintained at approximately 83° C. Based on 100% methanol, methylchloride and methylene chloride the effluent composition was 3 weight percent methanol, 58.7 weight percent methyl chloride and 38.3 weight percent methylene chloride. This was equivalent to a methanol conversion of 80%.

Although certain preferred embodiments of the invention have been disclosed for purpose of illustration, it will be evident that various changes and modifications may be made therein without departing from the scope and spirit of the invention.

We claim:

1. A method for the production of methyl chloride which comprises (a) passing gaseous hydrogen chloride in admixture with methanol at a molar ratio of $CH_3OH:HCl$ of about 0.61 to 1.07:1 through a reaction zone maintained at a temperature of 60° to 135° C., (b) dispersing an aqueous solution of zinc chloride containing about 52% to 80% by weight zinc chloride in said admixture of hydrogen chloride and methanol passing through said reaction zone to catalyze the reaction of methanol and HCl to produce methyl chloride, (c) separating the aqueous zinc chloride from the reaction products and, (d) separating and discharging the methyl chloride from the reaction zone containing less than about 500 p.p.m. dimethyl ether.

2. The method of claim 1 wherein the temperature of the reaction is maintained at 100° to 135° C.

3. The method of claim 1 wherein the zinc chloride concentration in the dispersed catalyst solution is between 55% and 80%.

4. The method of claim 1 wherein the methyl chloride product contains less than 200 parts per million dimethyl ether.

5. The method of claim 1 wherein the methyl chloride product contains less than 100 parts per million dimethyl ether.

6. The method of claim 1 wherein the dispersed aqueous catalyst solution is passed co-current to the mixture of hydrogen chloride and methanol.

7. The method of claim 1 wherein the dispersed aqueous catalyst solution is passed counter-current to the mixture of hydrogen chloride and methanol.

References Cited

UNITED STATES PATENTS

| | | | |
|---|---|---|---|
| 2,026,131 | 12/1935 | Klein et al. | 260—657 |
| 2,396,639 | 3/1946 | Carter | 260—657 |
| 2,406,195 | 8/1946 | Cass | 260—657 |
| 1,918,371 | 7/1933 | Berndt et al. | 260—657 |
| 2,559,720 | 7/1951 | Hunter | 260—657 |

FOREIGN PATENTS

| | | |
|---|---|---|
| 610,843 | 10/1948 | Great Britain. |
| 708,194 | 4/1954 | Great Britain. |

DANIEL D. HORWITZ, Primary Examiner